United States Patent
Lin et al.

(10) Patent No.: US 11,537,739 B2
(45) Date of Patent: Dec. 27, 2022

(54) SYSTEM AND METHOD FOR ANALYZING CONFIDENTIAL DATA

(71) Applicant: NATIONAL APPLIED RESEARCH LABORATORIES, Taipei (TW)

(72) Inventors: Hsi-Ching Lin, Hsinchu (TW); Yu-Shao Liu, Hsinchu (TW); August Chao, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 18 days.

(21) Appl. No.: 17/108,329

(22) Filed: Dec. 1, 2020

(65) Prior Publication Data
US 2021/0406393 A1 Dec. 30, 2021

(30) Foreign Application Priority Data
Jun. 29, 2020 (TW) ................. 109121904

(51) Int. Cl.
*G06F 21/62* (2013.01)
*H04L 9/14* (2006.01)
*H04L 9/40* (2022.01)

(52) U.S. Cl.
CPC ............ *G06F 21/6227* (2013.01); *H04L 9/14* (2013.01); *H04L 63/123* (2013.01)

(58) Field of Classification Search
CPC ..... G06F 21/6227; H04L 9/14; H04L 63/123; H04L 63/10; H04L 63/0428
See application file for complete search history.

(56) References Cited

U.S. PATENT DOCUMENTS

| | | | | |
|---|---|---|---|---|
| 7,926,095 B1* | 4/2011 | Weiner | ................. | H04L 9/0891 713/168 |
| 9,509,689 B1* | 11/2016 | Teng | ..................... | H04L 63/145 |
| 10,068,103 B2* | 9/2018 | O'Hare | ................ | H04L 9/0894 |
| 10,454,901 B2* | 10/2019 | Kho | .................... | G06F 21/6254 |
| 10,600,506 B2* | 3/2020 | Blum | ................... | G06F 21/6254 |
| 10,762,236 B2* | 9/2020 | Brannon | ............ | G06F 16/2379 |
| 10,824,751 B1* | 11/2020 | Kurian | .................. | G06F 16/282 |

(Continued)

OTHER PUBLICATIONS

R. Matsunaga, I. Ricarte, T. Basso and R. Moraes, "Towards an Ontology-Based Definition of Data Anonymization Policy for Cloud Computing and Big Data," 2017 47th Annual IEEE/IFIP International Conference on Dependable Systems and Networks Workshops (DSN-W), 2017, pp. 75-82, doi: 10.1109/DSN-W.2017.28. (Year: 2017).*

(Continued)

*Primary Examiner* — Jung W Kim
*Assistant Examiner* — Sameera Wickramasuriya
(74) *Attorney, Agent, or Firm* — Rosenberg, Klein & Lee (57) ABSTRACT

The present application is related to system and method for analyzing confidential data. Firstly, a first key is used to obtain a first analysis authorization for proceeding a first analysis responsive to an operational model in an encrypted cloud space with a connection of a network. Then, the result of the first analysis is verified. While the verifying of the operational model is pass, a second key is used to obtain a second analysis authorization for proceeding a second analysis responsive to an operational model without the connection of the network. Thereby, the cloud technique for analyzing data can be applied for analyzing confidential data.

9 Claims, 7 Drawing Sheets

(56) References Cited

U.S. PATENT DOCUMENTS

| | | | | |
|---|---|---|---|---|
| 2011/0296440 | A1* | 12/2011 | Launch | H04L 67/1097 |
| | | | | 719/326 |
| 2013/0054611 | A1* | 2/2013 | Lee | G06F 21/6227 |
| | | | | 707/E17.083 |
| 2013/0275773 | A1* | 10/2013 | Orsini | H04L 9/321 |
| | | | | 713/193 |
| 2015/0249687 | A1* | 9/2015 | O'Hare | H04L 9/321 |
| | | | | 726/3 |
| 2016/0147945 | A1* | 5/2016 | MacCarthy | H04W 12/02 |
| | | | | 705/51 |
| 2016/0291959 | A1* | 10/2016 | Searle | H04L 67/34 |
| 2017/0163683 | A1* | 6/2017 | van den Berghe | G06F 21/606 |
| 2018/0232528 | A1* | 8/2018 | Williamson | G06N 20/00 |
| 2020/0358602 | A1* | 11/2020 | Huang | G06F 21/602 |

OTHER PUBLICATIONS

G. L. Prakash, M. Prateek and I. Singh, "Data encryption and decryption algorithms using key rotations for data security in cloud system," 2014 International Conference on Signal Propagation and Computer Technology (ICSPCT 2014), 2014, pp. 624-629, doi: 10.1109/ICSPCT.2014.6884895. (Year: 2014).*

* cited by examiner

SYSTEM AND METHOD FOR ANALYZING CONFIDENTIAL DATA

FIELD OF THE PRESENT APPLICATION

The present application relates to a system for analyzing data and a method thereof, particularly to a method for analyzing confidential data and a system thereof, which provide a cloud platform able to analyze confidential data with data integrity, confidentiality and privacy, and provide highly reliable analysis result.

BACKGROUND OF THE PRESENT APPLICATION

In general, industry trends are the one that large companies will evaluate in terms of business development. Data analysts need to analyze from various kinds of data, yet, the analyzed data would inevitably have confidential data and data analysts would perform data analysis in a restricted place. Data analyzing files often have many different types or attributes, such as: financial data analysis, manufacturing output analysis and personal income analysis, etc.; data analysts use operating models for data analysis and obtain a meaningful data outline; for example: counting the occurring times of an attribute value A per day, counting the times that a certain column value is greater than a set value per day and etc.

Furthermore, nowadays, due to the increasing progress of internet technology, people often provide their personal information to a second party or a third party during their working, studying, shopping or club participating, etc. Yet, people's negligence and accidental revealing of personal information has jeopardized the so-called personal information security, therefore, personal information protection is emphasized. In order to avoid leaking of personal information and loss of company's and personal rights and interests, a personal information protection mechanism will be established from interior of an enterprise, such like the present ISO certification, to check whether there are a large number of personal information files distributed inside the company or not and to build the foundation for all personal protection works. Moreover, in order to strengthen personal information security and protect company's internal confidential information, the task of preventing the leaking of the confidential data has become an important information protection work for companies.

However, the present data analysis technology is using hardware devices to prevent the leaking of the confidential data, which restricts data analysts and data providers from providing data or being limited by the location of the hardware devices due to the limitations of the hardware devices. Data analysis is performed in the way that the provision of data or data analysis is limited to the same hardware device location. Although cloud computing technology and big data analysis are popular in today, analysis involving confidential data still cannot be performed on cloud computing platform.

Based on the aforesaid problems, the present application provides a confidential data analysis method and system that uses different keys to perform segment authorization on a cloud host, allowing users to perform segment analysis on the cloud and using the preliminarily authorized "first analysis" to verify whether or not the analysis is complete; then, use the authorized "second analysis" to obtain the formal analysis result.

SUMMARY

The main purpose of the present application is to provide a confidential data analysis method and a system thereof, which will control the cloud host to perform analysis during different authorization analysis processes through different degrees of authorization, in the goal of improving data security and can be applied in confidential data analysis.

The present application reveals a confidential data analysis method used for a cloud host according to corresponded first and second key segment authorizations; performing a data analysis at different authorization stages. The method firstly inputting a first key to the cloud host and obtaining a first analysis authorization; connecting an end-user device to the cloud host according to the first analysis authorization to send a plurality of first data and an operating model to an encrypted cloud space of the cloud host. Based on the operating model, it performs a first analysis on the first data to obtain a first analysis result. Then, it verifies the first analysis result. After the first analysis result is verified, input second key into the cloud host to obtain a second analysis authorization. The end-user device then transmits plural second data to the encrypted cloud space according to the second analysis authorization, and the cloud host performs a second analysis on the second data according to the operating model to obtain a second analysis result. By means of this, the present application allows the cloud host to perform the first analysis under the authorization of first key, and verify the analysis result to avoid failure in the formal analysis. Under the authorization of second key, it makes the cloud host to formal second analysis in the perform analysis stage under the state that the cloud host is offline. Thus, the security of formal analysis is promoted in confidential data analysis. By using the present application, cloud computing technology can be used in confidential data analysis.

The present application provides an embodiment in which after the step of performing second analysis to obtain a second analysis result, a third key is further inputted to the cloud host to obtain an analysis output authorization, and then the cloud host is authorized to output the second analysis result into a second analysis data according to the analysis output authorization.

The present application provides an embodiment, wherein in the step of obtaining an analysis output authorization from the cloud host according to a third key, the cloud host further provides authorization to confirm the analysis output authorization according to one of the second data, and proceeds to the next step.

The present application provides an embodiment, wherein before the step of obtaining a first analysis authorization of one of the cloud hosts according to first key, the cloud host first receives plural initial data of a large data database; the cloud host de-identifies the initial data and generates the corresponding second data; and the cloud host randomly samples to generate the corresponding first data according to the format of the second data.

The present application further discloses a confidential data analyzing system, which at least includes an encrypted storing unit, a cloud host and an end-user device. Connect at least one encrypted cloud space, which at least one encrypted cloud space stores plural first data and plural second data. The cloud host follow first key providing a first analysis authorization to end-user device; the cloud host follows second key providing a second analysis authorization to the end-user device; the end-user device follows the first analysis authorization transmitting plural first data and an operating model to the encrypted cloud space; the cloud host follows an operating model to perform a first analysis and obtain a first analysis result; the end-user device follows the second analysis authorization transmitting plural second data to the encrypted cloud space; the cloud host follows the operating model to perform a second analysis and obtain a second analysis result; while the cloud host is performing the first analysis, it connects to a network; while the cloud host is performing the second analysis, it disconnects the network. Therefore, through the segment authorization operation, the tested first analysis can perform verification, and further performs formal second analysis after the verification is done, and analyzes the confidential data on cloud technology.

The other embodiment of the present application is shown in below; in which the end-user device uploads a third key to the cloud host, the cloud host follows the third key providing an analysis output authorization, the cloud host follows the analysis output authorization outputting the second analysis results into a second analysis data.

The present application provides the other embodiment, in which the cloud host further follows one of the second data providing authorization to ensure the analysis output authorization, which outputs the second analysis results into the second analysis data.

The present application provides the other embodiment, in which the end-user device further uploads a third key to the cloud host; the cloud host follows one of the second data providing authorization and the third key provides an analysis output authorization; the cloud host follows the analysis output authorization outputting the second analysis results into a second analysis data.

The present application provides the other embodiment, in which the cloud host further connects to a data capture device, the data capture device captures plural initial data from a big data database to at least one encrypted cloud space, the cloud host de-identifies the initial data and generates corresponding second data and stores them in at least one encrypted cloud space; the cloud host follows these second data to randomly sample the first data and stores them in at least one encrypted cloud space; the cloud host stores the second analysis results in at least one encrypted cloud space.

DETAILED DESCRIPTION

Due to the fact that the traditional confidential data analysis cannot be applied in cloud technology, therefore, the present application brings up a confidential data analysis method and respective system to solve the well-known issue that the confidential data analysis cannot be applied in cloud technology.

Figure 1A:
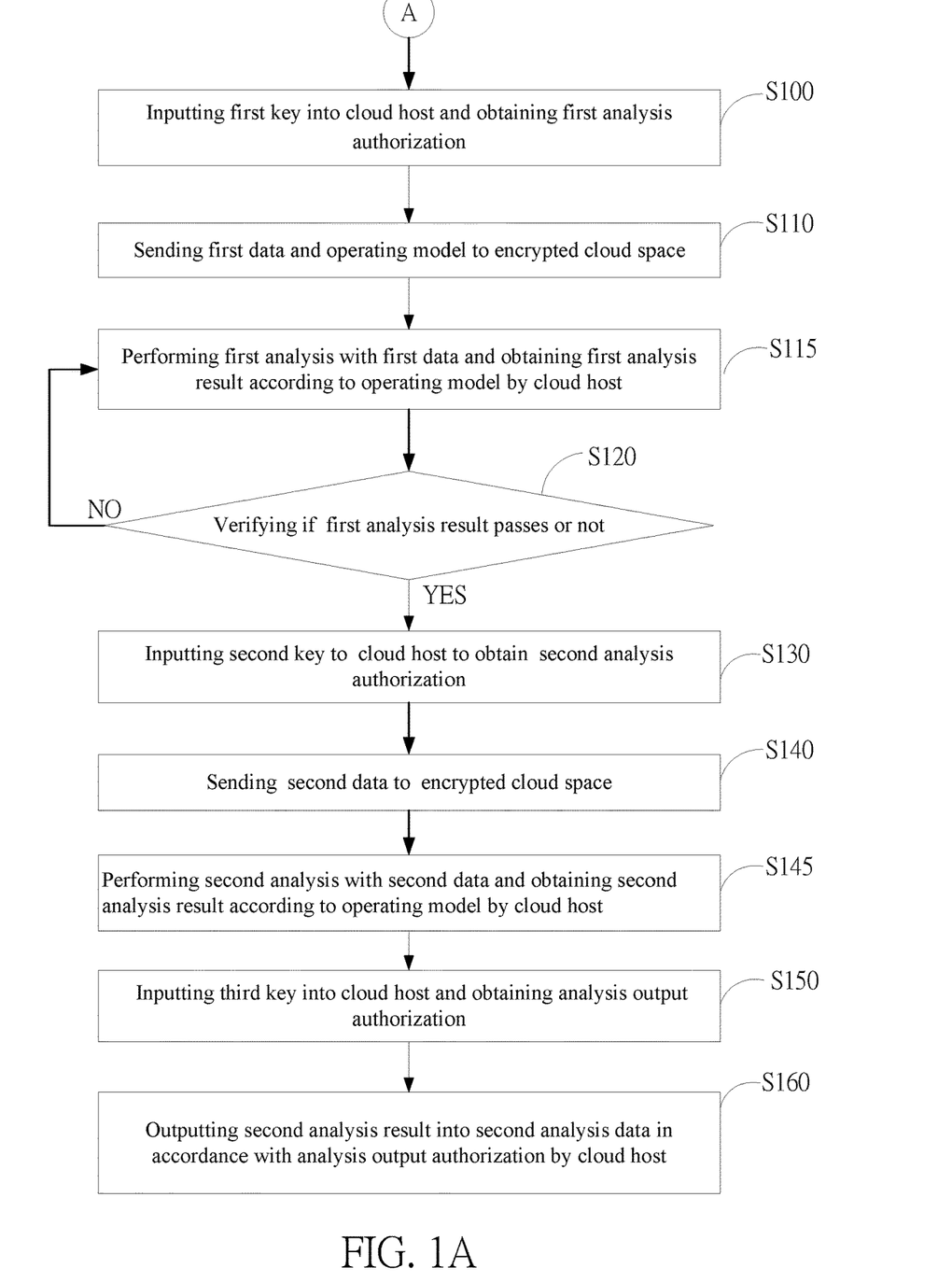
FIG. 1A to FIG. 1C: which are flowcharts of an embodiment of the present application.

In the following statement, we will further interpret the features and structure of an analysis method and system of confidential data disclosed in the present application:

Firstly, refer to FIG. 1A, which is a flowchart of an embodiment of the present application. As shown in the drawing, the steps of analyzing method in the present application include:

Step S100: Inputting first key into cloud host and obtaining first analysis authorization;

Step S110: Sending first data and operating model to encrypted cloud space;

Step S115: Performing first analysis with first data and obtaining first analysis result according to operating model by cloud host;

Step S120: Verifying if first analysis result passes or not;

Step S130: Inputting second key to cloud host to obtain second analysis authorization;

Step S140: Sending second data to encrypted cloud space; and

Step S145: Performing second analysis with second data and obtaining second analysis result according to operating model by cloud host.

Figure 2A:
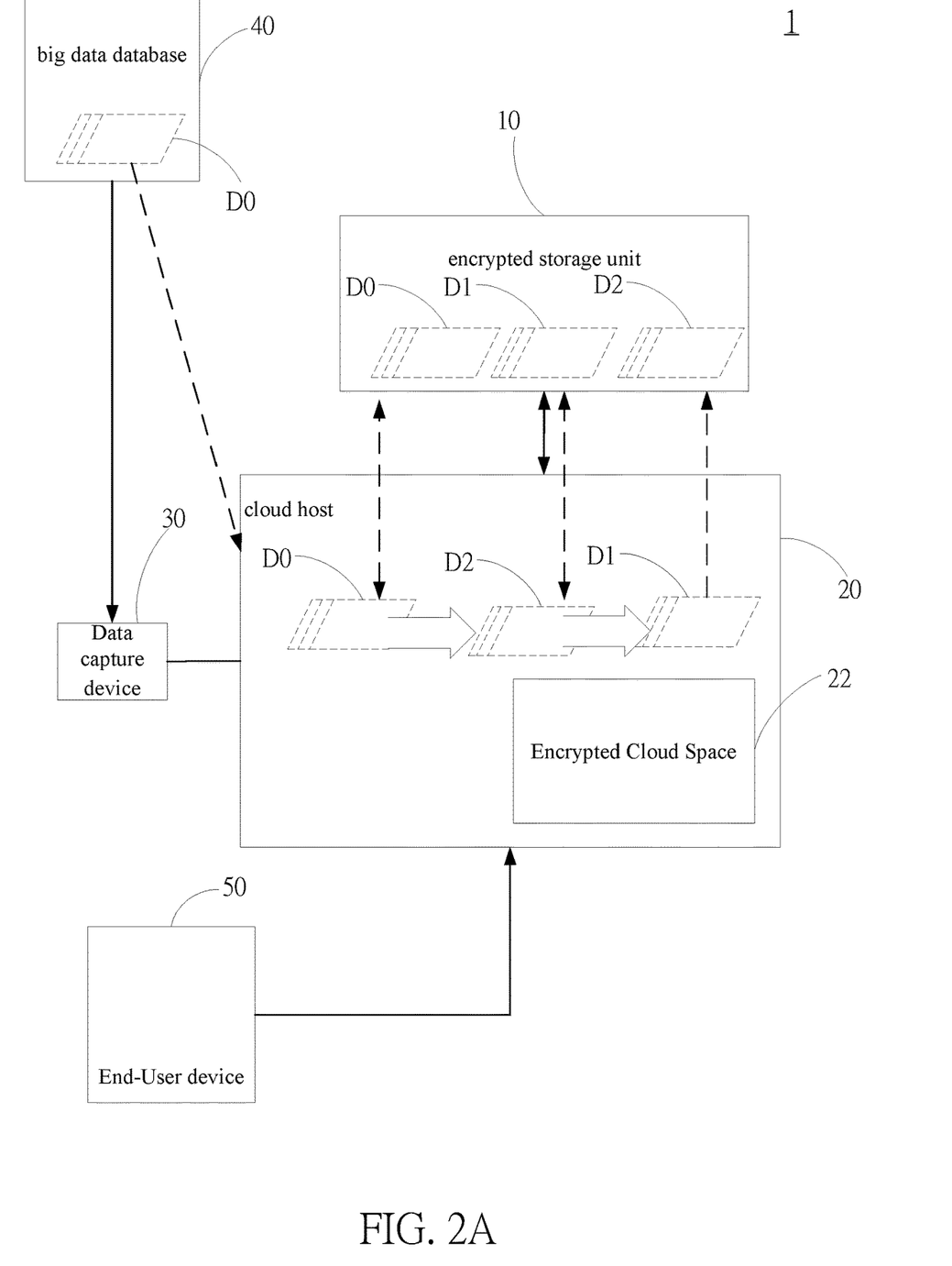
FIG. 2A to FIG. 2D: which are schematic diagrams of steps in an embodiment of the present application.
Figure 2B:
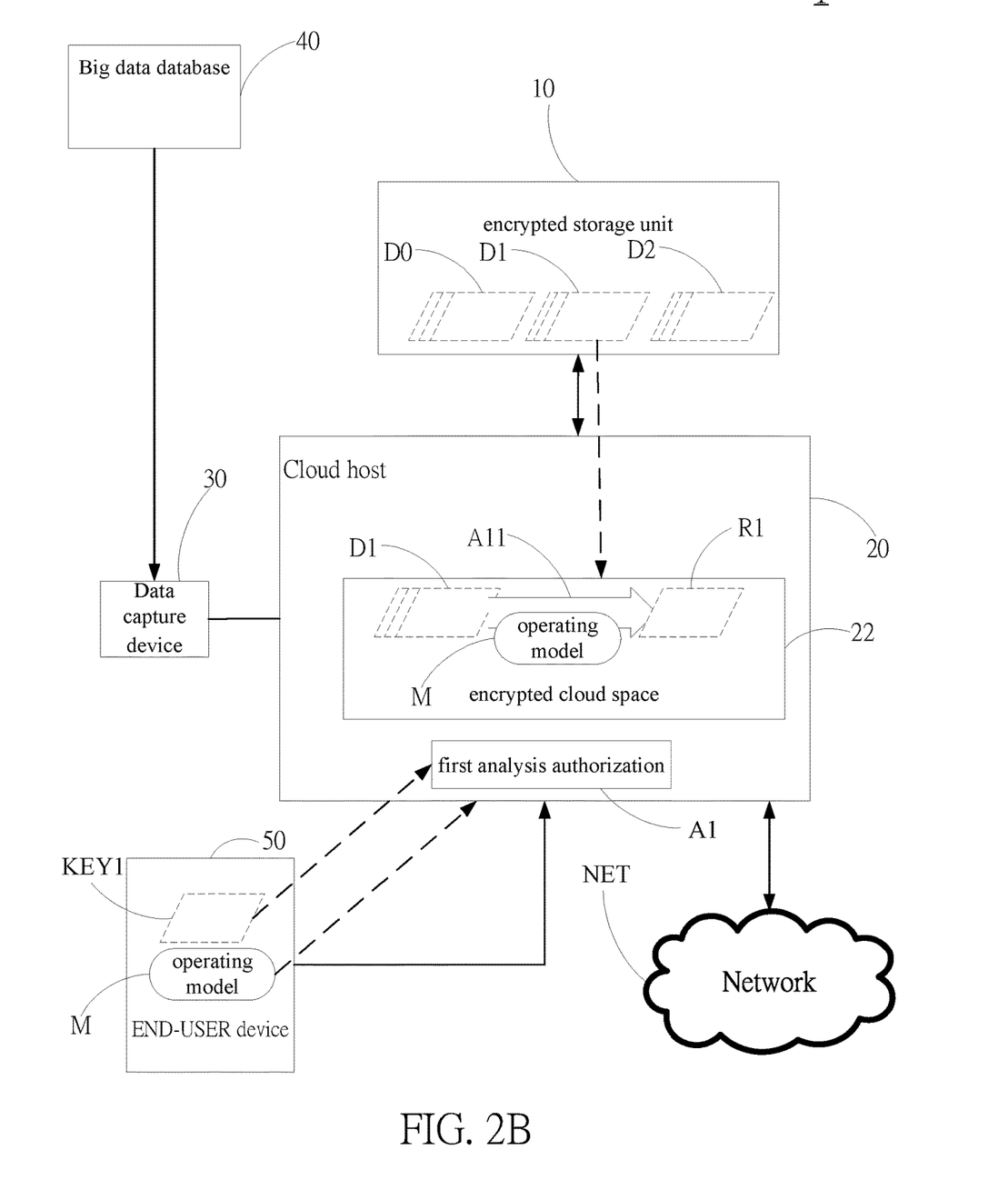
Figure 2C:
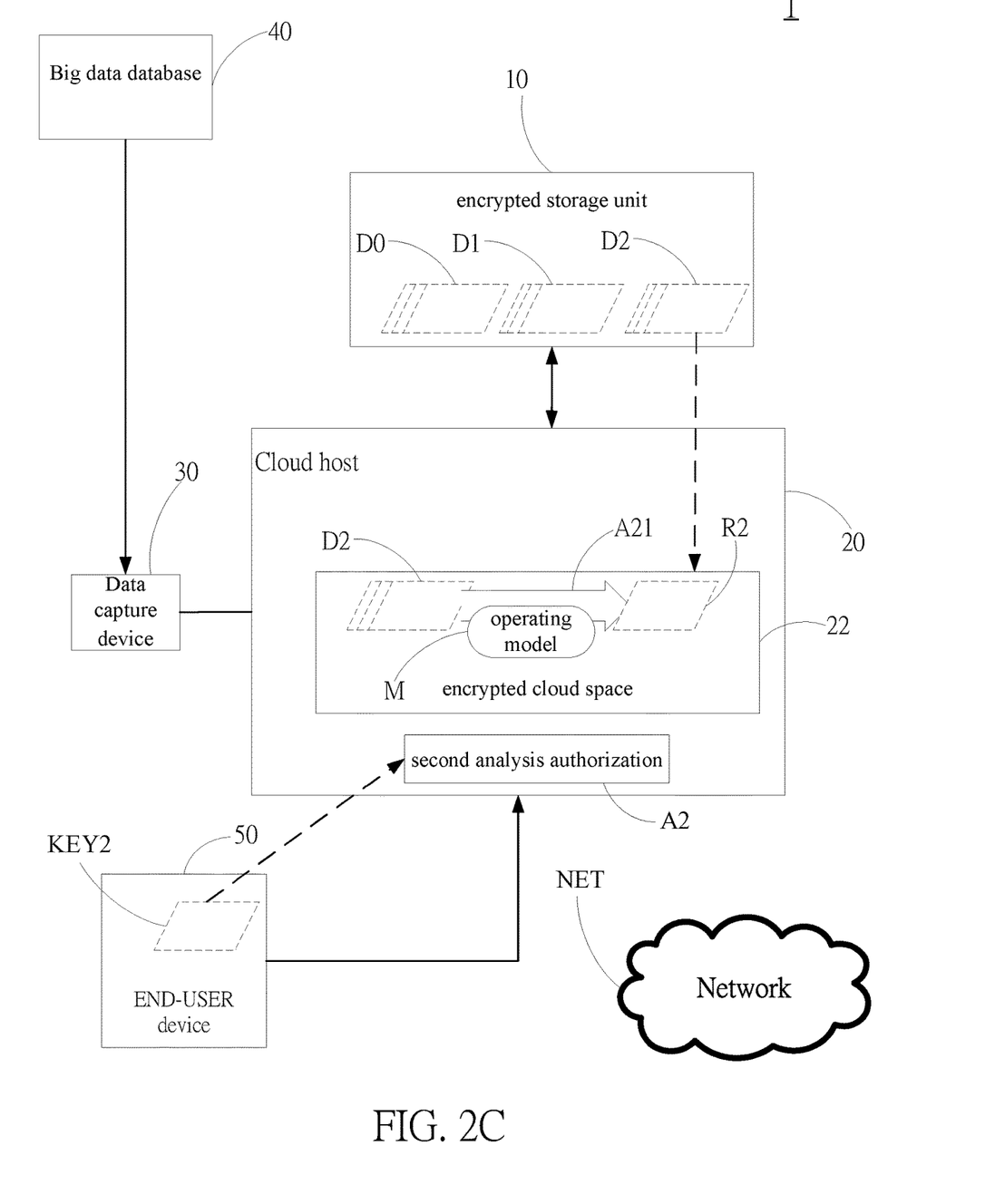

Refer to FIG. 2A to FIG. 2C, which are the schematic diagram of steps in an embodiment of the present application. The Analysis System 1 of confidential data in the present application at least includes an encrypted storage unit 10 and a cloud host 20; the cloud host 20 connects to the encrypted storage unit 10, the encrypted storage unit 10 stores plural first data D1 and second data D2; the cloud host 20 is an encrypted cloud space 22, and the cloud host 20 corresponds to a first key KEY1 and a second key KEY2; in this embodiment, a single encrypted storage unit 10 is taken for example. Besides, cloud host 20 can further connect to a data capture device 30 and it connects to a big data database 40.

In Step S100, user uses an End-User device 50 to connect to cloud host 20, having cloud host 20 receive first key KEY1 inputted from user and obtains a first analysis authorization A1, and thus continues performs Step S110. In Step S110, cloud host 20 follows the first analysis authorization A1 to read out the first data D1 in the encrypted storage unit 10 to the encrypted cloud space 22, and thus continues to perform Step S115, allowing cloud host 20 in encrypted cloud space 22 following operating model M to perform a first analysis A11 against first data D1, and obtains a first analysis result R1; from which, while cloud host 20 is performing first analysis A11 in the encrypted cloud space 22, it connects to a network (NET) and further sets the operating model M through the network NET; since the operating model M corresponds to the Artificial Neural Network Algorithm (for example, the Graph Neural Networks (GNN) and Convolutional Neural Network (CNN)), the encrypted cloud space 22 will train the operating model M while it is performing the first analysis A11. In the continual Step S120, cloud host 20 follows the corresponding verifying rule of the operating model M to verify the first analysis result R1; if the verifying result is successful, continue to perform Step S130; if the verifying result fails, continue to perform Step S115 to continue to re-perform the first analysis A11 by using the modified operating model M. In Step S130, cloud host 20 receives a second key KEY2 inputted from user and obtains a second analysis authorization A2, and continues to perform Step S140.

Continue to above, in Step S140, cloud host 20 read out the second data D2 from encrypted storage unit 10 and put them to encrypted cloud space 22, enables cloud host 20 encrypted cloud space 22 following the operating model M to perform a second analysis A21 toward the second data D2 and obtains a second analysis result R2; while cloud host 20 is performing the second analysis A21, it disconnects from the network NET, the second data D2 are closed encrypted data, which cannot be read out and display directly after downloading; under the case that since these second data D2 are confidential data, the cloud host 20 is unable to reveal data while undertaking the second analysis A21 and thus increases the data security during cloud data analysis. Moreover, after the second analysis result R2 is generated, cloud host 20 can further eliminate encrypted cloud space 22 and increase the data security level.

Refer to FIG. 1A, the steps of analyzing method of confidential data in the present application include:

Step S150: Inputting third key into cloud host and obtaining analysis output authorization; and Step S160: Outputting second analysis result into second analysis data in accordance with analysis output authorization by cloud host.

Figure 2D:
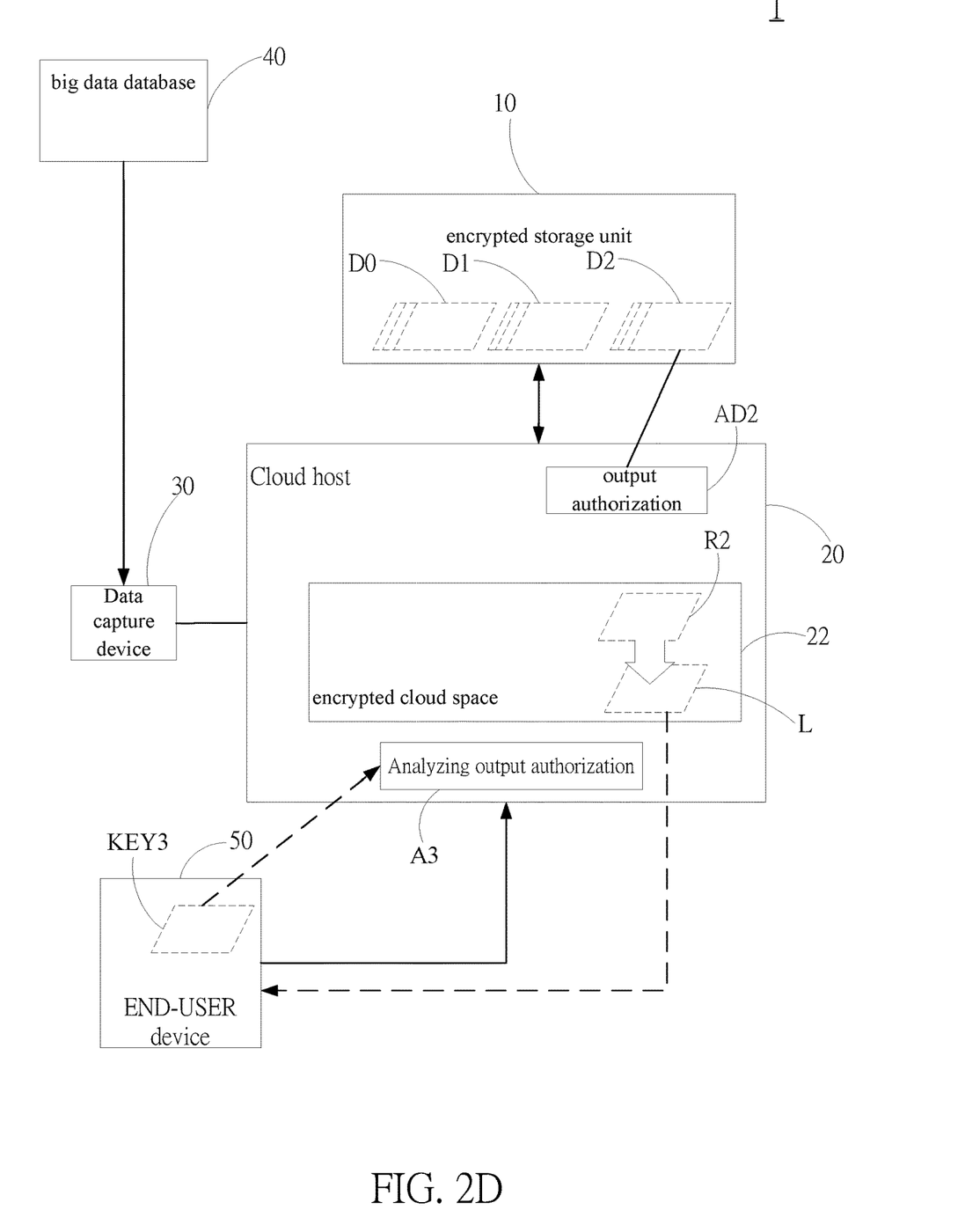

In Step S150, further refer to FIG. 2D, cloud host 20 receives KEY 3 inputted by user through the End-User device 50 to let user obtain the third-stage authorization of cloud host 20, that is, analyze the output authorization A3 to permit user to input the generated second analysis result R2, obtained in Step S140 to external of cloud host 20. In addition, cloud host 20 can further follow one of these second data D2 providing the output authorization AD2 to confirm the validity/legality of analyzing the output authorization A3. Moreover, in Step S150, it can directly and simultaneously follow one of the second data D2 to provide authorization to the KEY 3 to ensure the validity/legality of analyzing the output authorization A3; let cloud host 20 allow user to permit to output the second analysis result R2 generated in Step S140 to external of cloud host 20. In Step S160, further refer to FIG. 2D, cloud host 20 can follow the result of analyzing output authorization A3 to provide the output way of second analysis result R2; this embodiment take the example of generating a download linking L and transmits the second analysis result R2 to End-User device 50, yet, the present application doesn't restrict to this matter, it can be a mail, attachment or faxing image, having user to obtain second analysis result R2 at external of cloud host 20.

Figure 1B:
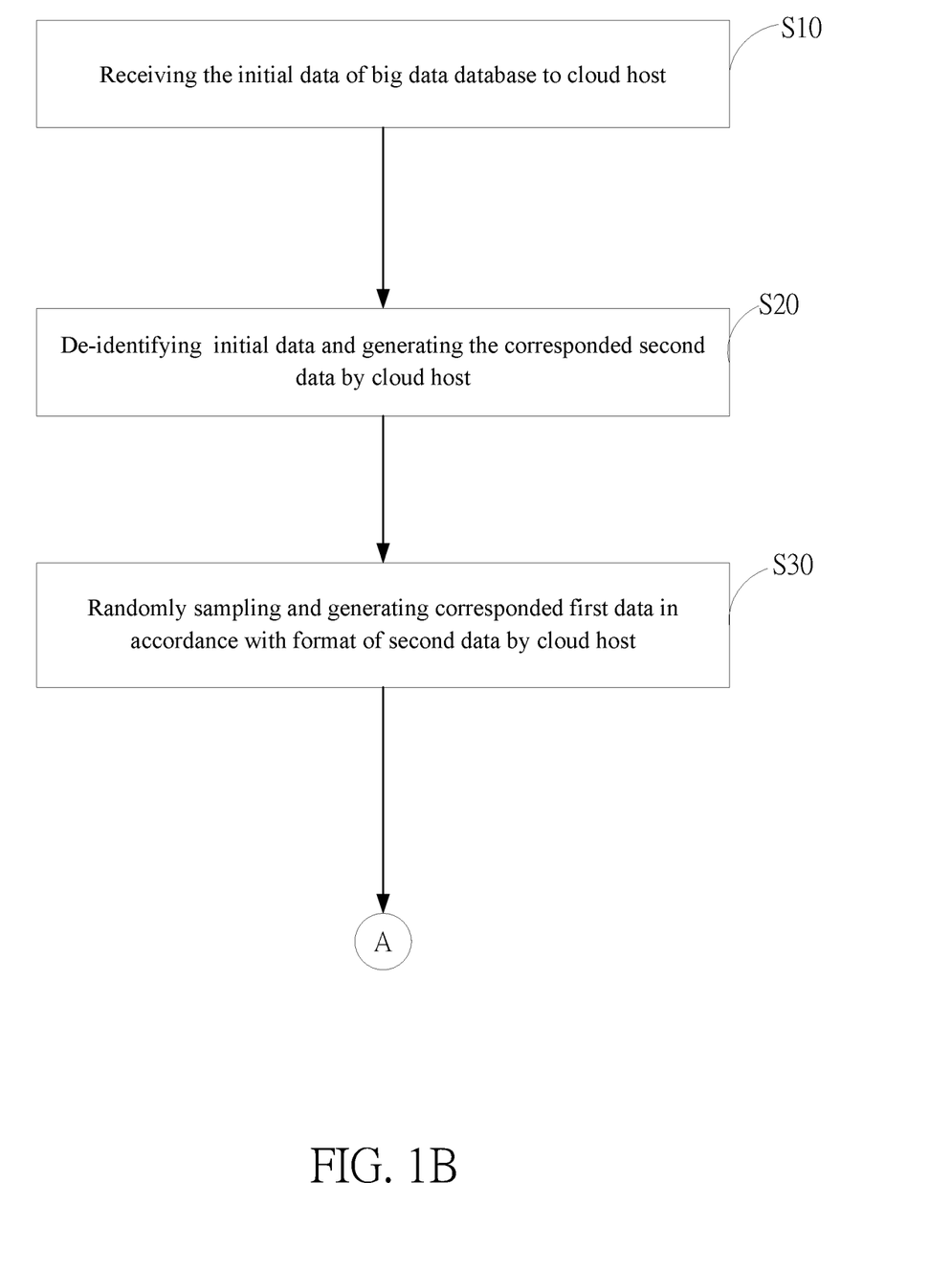

As shown in FIG. 1B, the steps of analyzing confidential data in the present application further include:

Step S10: Receiving the initial data of big data database to cloud host;

Step S20: De-identifying initial data and generating the corresponded second data by cloud host; and Step S30: Randomly sampling and generating corresponded first data in accordance with format of second data by cloud host.

Therefore, the analyzing method of confidential data in the present application before Step S100 further includes the Step S10 to Step S30; further refer to FIG. 2A, in Step S10, cloud host 20 receives plural Initial Data D0 in big data database 40 through a data capture device 30 and stores them in encrypted storage unit 10. In Step S20, cloud host 20 de-identifies Initial Data D0 in encrypted storage unit 10, and generates the de-identified or personal data second data D2 and stores them in encrypted storage unit 1. In Step S30, cloud host 20 follows the format of second data D2 to randomly sample second data D2, generates the first data D1 and stores them in encrypted storage unit 10.

Figure 1C:
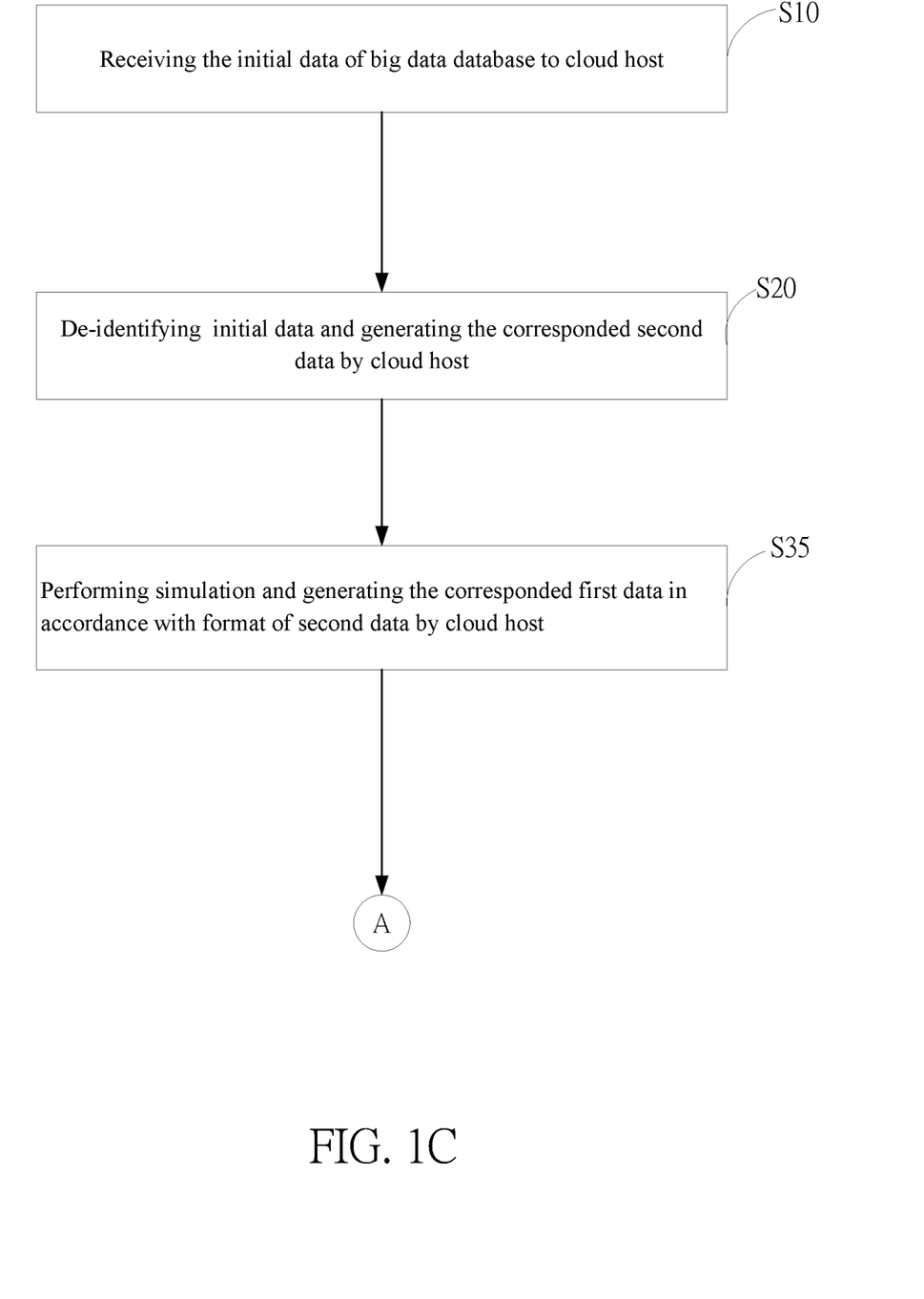

Except the aforesaid random sampling according to the format of second data D2 and generating the corresponded first data, it also can follow the format of second data D2 to perform data simulation and generates the corresponded first data; refer to FIG. 1C, the steps of analyzing method of confidential data in the present application also include:

Step S10: Receiving the initial data of big data database to cloud host;

Step S20: De-identifying initial data and generating the corresponded second data by cloud host; and Step S35: Performing simulation and generating the corresponded first data in accordance with format of second data by cloud host.

For Step S10 to Step S20 we won't repeatedly interpret them; in the former embodiment, Step S20 continues to perform Step S30; yet, in this embodiment, Step S20 continues to perform Step S35; wherein in Step S35, cloud host follows the format of second data D2 to perform simulation and generate the first data D1; here first data D1 are treated as the simulated data.

In summary, the confidential data analysis method and system of the present application uses different keys to authorize a cloud host in segments and perform data analysis for encrypted cloud spaces with different encryption levels, and follows the second data to randomly sample the formed first data, analyze the first data according to the first analysis of the operating model used in the test, and then verify the operating model according to the first analysis result. After the operating model is verified, perform the second analysis to second data (i.e., real data) immediately to obtain the second analysis result corresponding to second data, which is applied to increase data security of the real data, and further providing a key for data output, in the goal of further protecting data from leaking.

What is claimed is:

1. A method for analyzing confidential data, applied to segment authorizations of a cloud host according to corresponded first and second keys, including the steps of:

Inputting the first key into the cloud host and obtaining a first analysis authorization;

Connecting an end-user device to the cloud host, and reading a plurality of first data and an operating model into an encrypted cloud space in the cloud host according to the first analysis authorization;

Performing a first analysis with the plurality of first data stored in the encrypted cloud space and obtaining a first analysis result according to the operating model by using the cloud host;

Uploading the first analysis result to the cloud host and performing verification;

When the first analysis result passes the verification, inputting the second key into the cloud host and obtaining a second analysis authorization;

Transferring a plurality of second data into the encrypted cloud space by the end-user device according to the second analysis authorization; and Performing a second analysis with the plurality of second data stored in the encrypted cloud space and obtaining a second analysis result according to the operating model by the cloud host;

wherein the plurality of first data is generated by simulating according to a format of the plurality of second data or by random sampling the plurality of second data.

2. The method for analyzing confidential data of claim 1, after the step that the end-user device follows the operating model to perform a second analysis with the plurality of second data in the encrypted cloud space and obtains a second analysis result, it also includes:

Inputting a third key into the cloud host to obtain an analysis output authorization; and The cloud host follows the analysis output authorization to output the second analysis result into a second analysis data.

3. The method for analyzing confidential data of claim 2, in the step of inputting a third key into the cloud host to obtain an analysis output authorization, the cloud host further follows one of the plurality of second data to provide authorization to confirm the analysis output authorization, so as to continue to perform the step of the cloud host follows the analysis output authorization to output the second analysis result into the second analysis data.

4. The method for analyzing confidential data of claim 2, before the step of inputting the first key into the cloud host and obtaining a first analysis authorization, the steps also include:

The cloud host receives plural initial data from a big data database;

The cloud host de-identifies the plural initial data and generates the corresponded plurality of second data; and The cloud host performs random sampling or simulation, and generates the corresponded plurality of first data according to the format of the plurality of second data.

5. A system for analyzing confidential data, comprising:

At least one encrypted storing unit that stores a plurality of first data and second data;

A cloud host that connects to at least one encrypted cloud space; and

An end-user device that connects to the cloud host, transmitting a first key and a second key to the cloud host; the cloud host follows the first key to send a first analysis authorization to the end-user device; the cloud host follows the second key to send a second analysis authorization to the end-user device; the end-user device follows the first analysis authorization to send a plurality of first data and one operating model to the encrypted cloud space; the cloud host follows the operating model to perform a first analysis on the plurality of first data and obtains a first analysis result; the end-user device follows the second analysis authorization to send a plurality of second data to the encrypted cloud space; the cloud host follows the operating model to perform a second analysis on the plurality of second data and obtains a second analysis result, while performing the first analysis, the cloud host connects to a network; and while performing the second analysis, the cloud host disconnects the network; the plurality of second data are closed encrypted data;

wherein the plurality of first data is generated by simulating according to a format of the plurality of second data or by random sampling the plurality of second data.

6. The system for analyzing confidential data of claim 5, in which the end-user device further uploads a third key to the cloud host, the cloud host follows the third key to provide an analysis output authorization; the cloud host follows the analysis output authorization to output the second analysis result into a second analysis data.

7. The system for analyzing confidential data of claim 6, in which the cloud host further follows one of the plurality of second data to provide authorization to output the second analysis result into the second analysis data.

8. The system for analyzing confidential data of claim 5, in which the end-user device further uploads a third key to the cloud host; the cloud host follows one of the plurality of second data to provide authorization, and the third key provides an analysis output authorization; the cloud host follows the analysis output authorization to output the second analysis result into a second analysis data.

9. The system for analyzing confidential data of claim 5, in which the cloud host further connects to a data capturing device; the data capturing device captures a plurality of initial data in a big data database and sends them to the at least one encrypted storing unit; the cloud host de-identifies the plurality of initial data and generates the corresponded plurality of second data, stored in the at least one encrypted storing unit; the cloud host generates the plurality of first data by the cloud host simulating according to the format of the corresponded plurality of second data or randomly sampling the corresponded plurality of second data, and stores them in the at least one encrypted storing unit; the cloud host stores the second analysis result in the at least one encrypted storing unit.

\* \* \* \* \*